Feb. 14, 1933.  W. J. SIMPSON  1,897,534
CUTTING APPARATUS
Filed March 20, 1931   2 Sheets-Sheet 1
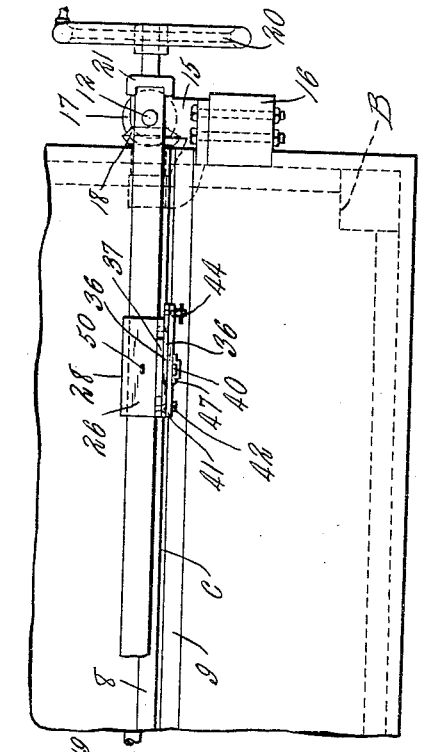
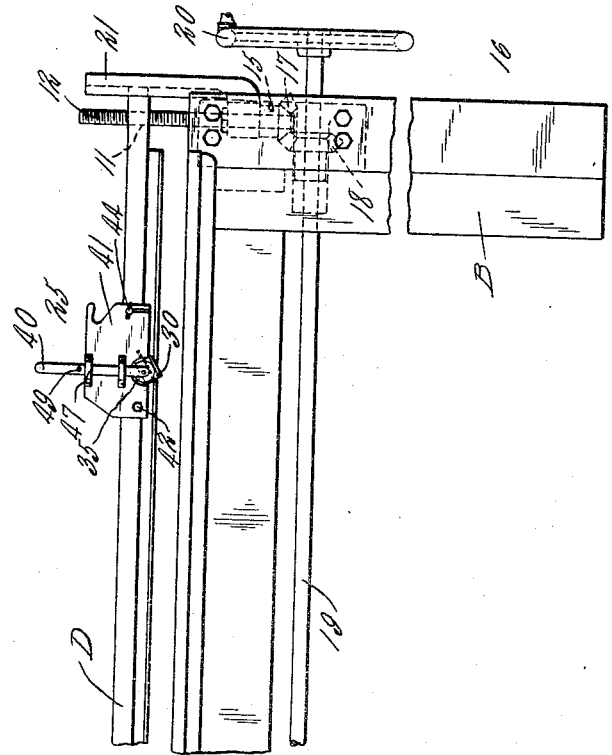
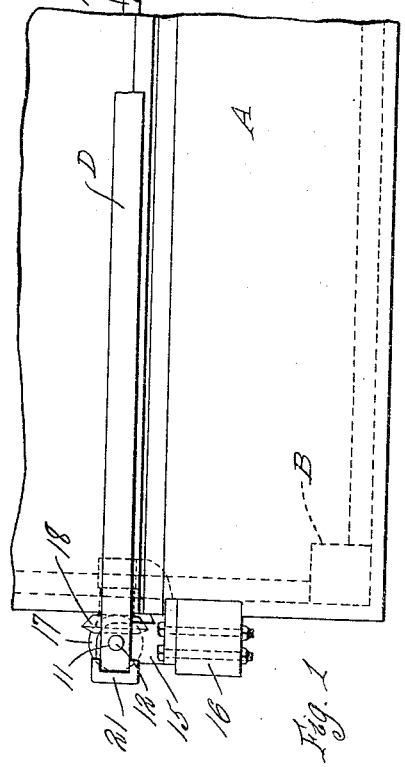
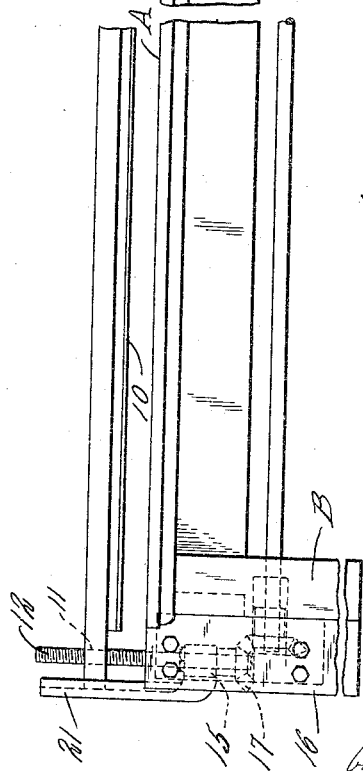
Fig. 1
Fig. 2
INVENTOR
William J. Simpson
by Parker & Prachnow
ATTORNEYS.

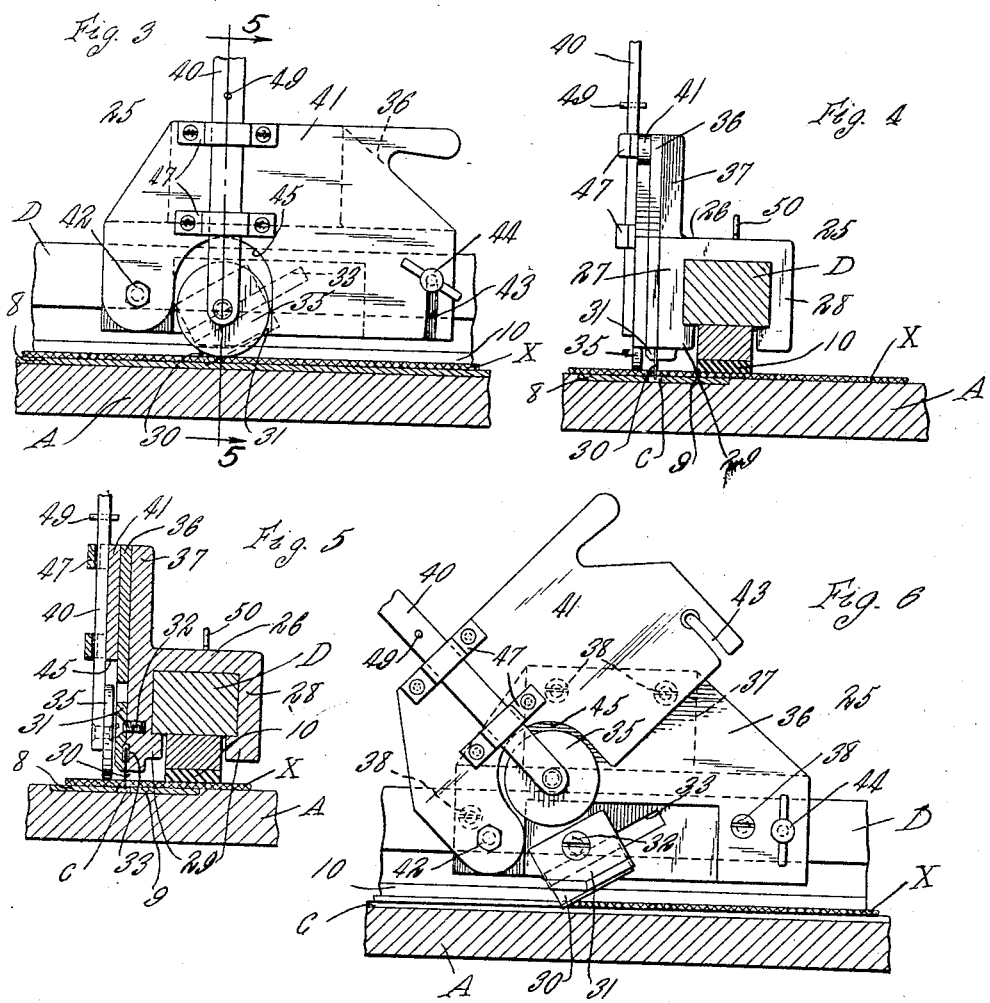

Patented Feb. 14, 1933

1,897,534

UNITED STATES PATENT OFFICE

WILLIAM J. SIMPSON, OF EVERETT, MASSACHUSETTS, ASSIGNOR, BY MESNE ASSIGNMENTS, TO THE ELECTRIC SMELTING & ALUMINUM CO., OF CLEVELAND, OHIO, A CORPORATION OF OHIO

CUTTING APPARATUS

Application filed March 20, 1931. Serial No. 524,032.

This invention relates to cutting apparatus of the kind which is intended primarily for cutting webs or sheets in a direction crosswise of their length, but which may be used for cutting other materials.

The objects of this invention are to provide an apparatus for cutting webs of material crosswise at a definite angle to the length of the web; also to provide an apparatus of this kind by means of which the web to be cut is clamped adjacent to the part thereof to be cut so that no portion of the web can shift during the cutting; also to provide an apparatus of this kind in which the cutting member is mounted to move lengthwise on the clamping member; also to provide an apparatus of this kind with means for holding the web against shifting at opposite sides of the line of cut; also to provide an apparatus of this kind which is particularly adapted to operate on comparatively heavy webbing such as canvas or the like; also to provide an apparatus of this kind with a cutting member of improved construction; also to improve the construction of an apparatus of this kind in other respects hereinafter specified.

In the accompanying drawings:

Fig. 1 is a fragmentary top plan view, partly broken away, of a cutting apparatus embodying this invention showing the same mounted near an end of a cutting table;

Fig. 2 is an end elevation thereof;

Fig. 3 is an elevation on an enlarged scale of the cutting member;

Fig. 4 is a side view thereof;

Fig. 5 is a sectional elevation thereof, on line 5—5, Fig. 3; and

Fig. 6 is a view of the cutting member similar to Fig. 3, but having a part thereof moved into a position to expose the knife.

In the cutting of duck or canvas for making aprons for ironing machines, it is very necessary that the ends of the aprons are both cut at exactly 90° to the length of the apron, since otherwise the aprons will not travel correctly over the rolls of the ironing machine and will consequently be subject to excessive wear and otherwise cause trouble. Because of the width of these aprons and of the toughness of the canvas from which they are made, considerable difficulty has heretofore been experienced in cutting these aprons. This machine is primarily intended to be used in connection with the cutting of canvas to make aprons for ironing machines and to overcome the difficulties heretofore experienced, but it will be understood that it is not intended to limit this invention to use only for cutting aprons for ironing machines since obviously the machine may be used for cutting other webs or sheets.

The cutting apparatus is preferably mounted near one end of a cutting table on which the web to be cut may be laid lengthwise. A represents the top surface of the cutting table. The table may be of any suitable or desired construction, that shown having legs B for supporting the same on a floor. The surface of the table is preferably flat except for a groove or slot C in the upper face thereof through which the knife may pass, and in the construction shown this groove or slot is formed between two metal plates 8 and 9 which are countersunk into the top face of the table so that their upper faces are flush with the upper surface of the table. Any other manner of providing a groove in the table may be employed.

D represents a rigid clamping bar extending crosswise of the table adjacent to the cutting groove or slot C. This clamping bar may be of any suitable or desirable construction, that shown being made of two parts suitably secured together one above the other, the upper part being of greater width than the lower part. The clamping bar may, however, be made of a single piece or integral construction, if desired. At its lower face, the clamping bar is preferably provided with a yielding or compressible pad 10 suitably secured to the lower face of the clamping bar. This pad 10 may be made of any suitable or desired material, sponge rubber having been found very satisfactory for grasping the web and securely holding it in any desired position.

In order to move the clamping bar toward and from the upper face of the table, any suitable mechanism may be provided. In the particular construction shown, the clamping bar is provided near each end with a screw threaded aperture 11 in which a clamping screw 12 engages. By turning this screw, the clamping bar may be moved upwardly or downwardly as desired.

Any suitable or desired mechanism for turning of the clamping screws 12 at the same time may be provided, that shown including a bearing bracket 15 at each side of the apparatus. The clamping screws 12 are journalled in these brackets, and the brackets themselves may be suitably bolted or otherwise secured on a pair of legs or upright supports 16, which are also secured to the table. The lower end of each clamping screw is provided with a bevel gear 17. Each of these bevel gears 17 meshes with a bevel gear 18, and the two gears 18 are secured on a shaft 19 which extends crosswise of the table underneath the same and the shaft is provided with a hand wheel or crank 20 or any other suitable means for turning the shaft. The shaft is also journalled near its opposite ends in the bearing brackets 15. Consequently, by turning the shaft, both bevel gears 18 impart a rotary motion to the bevel gears 17, and consequently, to the clamping screws 12. If desired, the bearing brackets 15 may also be provided with upright guide members 21, the inner sides of which are channeled or recessed to receive the ends of the clamping bar D, and to guide this bar in its vertical movement.

The clamping bar D may be shaped or formed in any suitable or desired manner to serve as a guide track for a cutting member. The clamping bar, in the construction shown, is approximately of T-shaped cross section (see particularly Figs. 4 and 5), which makes it possible to mount a carriage 25 for the knife or cutting member on the upper part of the clamping bar, and at the same time, the upper portion of this bar reinforces or stiffens the same. The carriage 25, in the construction shown, is formed with a part 26 extending across the top of the clamping bar and has side members 27 and 28 which extend along the sides of the clamping bar, and which terminate at their lower ends in inwardly extending projections 29 which engage a portion of the lower or bottom face of the upper part of the clamping bar. A carriage of any other construction movable lengthwise of the clamping bar may be employed.

The carriage 25 may have a knife or cutting blade mounted thereon in any suitable or desired manner. In the particular construction shown, a relatively small cutting member or blade 30, such as a safety razor blade, is employed. This cutting blade may be clamped against the side 27 of the carriage in any desired manner, for example, by means of a clamping plate 31 which may be clamped to the side of the carriage by means of a screw 32. The side 27 of the carriage may also be provided with a groove or recess 33 and a similar groove may be provided in the clamping plate 30 to receive the thickened back portion of a safety razor blade, if this type of blade is used. The cutting blade is so adjusted on the carriage that a portion thereof enters into the groove C, so that the cutting edge of the blade extends in an angle upwardly from this point. For this purpose, the groove 33 and the corresponding groove in the clamping plate 31 is inclined so that the cutting blade may be adjusted to extend to the desired extent into the groove C. It will be observed from the foregoing description that the cutting blade will move lengthwise of the clamping bar close to the one side thereof, when the carriage 25 moves along the clamping bar.

It has been found that it is desirable in many instances to hold the work to be cut in contact with the table at the side of the cutting blade opposite to that on which the clamping bar is located. Any suitable or desired pressing means may be provided for this purpose. In the particular construction illustrated, a presser wheel 35 is provided which is also mounted to move with the carriage 25 of the cutting member. This wheel may be mounted on the carriage as desired. In the particular construction illustrated, a spacing plate 36 having a portion thereof recessed to receive the cutting blade and clamping plate therefor is secured to the side 27 of the carriage and to an upward extension 37 thereof, screws 38 being shown for securing the spacing plate to the carriage. The presser wheel 35 is preferably so arranged that it presses downwardly on the work X at one side and slightly in advance of a portion of the cutting blade which cuts the web. In order to mount the presser wheel in this location, and also to make it possible to move this wheel out of the way of the knife clamping plate 31 when it is desired to change or adjust the knife, the presser wheel is journalled at the lower end of a guide bar 40. This bar is slidably mounted on a plate 41 pivoted near one end thereof at 42 on the spacing plate 36. The other end of the pivoted plate 41 is provided with a slot 43 into which a clamping screw 44 having a threaded engagement with the spacing plate 36, may enter for securing the pivoted plate 41 in its adjusted position. The plate 41 is provided with a cut-out portion 45 in which the presser wheel 35 may operate. Straps 47, secured to the pivoted plate 41, guide the bar 40 to permit the same and the presser wheel 35 to move up and down relatively to the carriage. The weight of the presser wheel and guide bar 40 is sufficient to hold the web against shifting by the cutting blade 30, but additional means for pressing the wheel against the work may be used.

In the use of the apparatus described, the work to be cut is first placed on the table in such a manner that the part to be cut lies across the groove C. During the arrangement of the web on the table the carriage 25 of the cutting member is preferably positioned at the side of the table shown at the left in Figs. 1 and 2. After the web has been placed in correct position for cutting, the crank 20 is turned to move the clamping bar D downwardly against the web so that the sponge rubber pad 10 frictionally holds the web against shifting. The cutting is then effected by moving the carriage 25 across the table. After the cutting has been completed, a clamping member is again raised by turning the crank 20. This moves the carriage upwardly with the clamping bar, so that the carriage 25 can then be moved to the side of the tables shown at the left side of Figs. 1 and 2, without interfering in any way with the work, whereupon the machine is ready for the next clamping and cutting operations.

During the movement of the carriage in a direction to cut the web, the presser wheel 25 rolls over the web and assists in holding the web against shifting while being cut. A pin 49 may be arranged in the bar 40 to prevent this bar from dropping out of its guides when the carriage and clamping bar are raised, and an eye 50 may be secured on the carriage 25, to which a cord (not shown) may be attached for pulling the carriage across the table either to make the cut or to return the carriage.

I claim as my invention:

1. In a cutting apparatus, the combination of a table for supporting the work to be cut, a clamping bar extending crosswise of the table and movable toward the table for clamping a portion of the work to the table adjacent to the line of cut, a carriage mounted on and movable lengthwise of the clamping bar, a cutting blade mounted on the carriage to cut said work adjacent to said clamping bar, and means movable with said carriage for holding the work against shifting on the side of the cutting blade opposite to the clamping bar.

2. In a cutting apparatus, the combination of a table, means for clamping the work to be cut to the table, a carriage movable crosswise of the table and mounted on said clamping means, a cutting blade mounted on the carriage to cut the work, and a presser device movable with the carriage for holding the work against said table adjacent to the cutting blade.

3. In a cutting apparatus, the combination of a table, a clamping member extending crosswise of the table for clamping against the table the portion of the work adjacent to the line of cut, a carriage mounted on said clamping member and movable crosswise of the table, a knife carried by the carriage for cutting the work adjacent to said clamping device, and a presser device movable with the carriage and arranged to press the work against the table at the side of the knife opposite to that on which the clamping member is arranged.

4. In a cutting apparatus, the combination of a table, a clamping bar extending crosswise of the table for clamping the portion of the work to be cut against the table, a carriage movable lengthwise of said clamping bar, a knife supported on said carriage at a side of said bar, and a presser device mounted on the carriage and arranged to press against the portion of the work at the side of the knife opposite to that at which the clamping bar is located.

5. In a cutting apparatus, the combination of a table, clamping means for clamping the work to the table, a carriage mounted on said clamping means and movable crosswise of the table, a knife carried by the carriage for cutting the work during the movement of the carriage, a presser device mounted on the carriage and adapted to press the work against the table on the side of the knife opposite to that on which the clamping means are arranged, said presser device being mounted on the carriage to move crosswise of the table with the carriage and to move toward and from the work independently of the carriage, whereby the work to be cut is held against the table at opposite sides of the knife.

6. In a cutting apparatus, the combination of a table, clamping means for holding the portion of the work to be cut in fixed relation to the table, a carriage mounted on said clamping means and movable crosswise of the table, a knife carried by said carriage for cutting the work while the carriage is moving crosswise of the table, a presser member mounted on said carriage at the side of said knife opposite to that on which the said clamp means are arranged, and supporting means for said presser member which are movably mounted on the carriage to move said presser member into an inoperative position away from the side of the knife to afford access to said knife.

7. In a cutting apparatus, the combination of a table, a bar extending across the table, a carriage mounted on said bar and guided thereby in its movement lengthwise of said bar and across the table, a knife secured to said carriage, a presser member mounted on said carriage at the side of said knife, a support movably mounted on said carriage, means for slidably mounting said presser member on said support, and means for securing said support in an operative position in which said presser member can engage the work, said support being movable into an inoperative position in which said presser member is out of the way of said knife to afford access to said knife.

8. In a cutting apparatus, the combination of a table for supporting the work to be cut, a clamping bar arranged above the table and movable toward the table for clamping a portion of the work to the table adjacent to the line of cut, a carriage movable lengthwise of said clamping bar, a cutting blade mounted on said carriage to cut said work adjacent to said clamping bar, and clamping means movably mounted on said carriage for holding the work against shifting on the side of the cutting blade opposite to the clamping bar, said clamping means being movable into an inoperative position to render said cutting blade accessible.

WM. J. SIMPSON.